United States Patent
Wang et al.

(10) Patent No.: US 11,175,229 B1
(45) Date of Patent: Nov. 16, 2021

(54) BIOLOGICAL DETECTION DEVICE

(71) Applicant: GeneSense Technology Inc., Shanghai (CN)

(72) Inventors: Xianchao Wang, Shanghai (CN); Bingzhou Hong, Shanghai (CN); Haochen Cui, Shanghai (CN); Kun Luo, Shanghai (CN); Yinghua Sun, Shanghai (CN); Mei Yan, Shanghai (CN)

(73) Assignee: GeneSense Technology Inc., Shanghai (CN)

( * ) Notice: Subject to any disclaimer, the term of this patent is extended or adjusted under 35 U.S.C. 154(b) by 0 days.

(21) Appl. No.: 17/246,564

(22) Filed: Apr. 30, 2021

(30) Foreign Application Priority Data

Aug. 19, 2020 (CN) .......................... 202010837541.5

(51) Int. Cl.
*G01N 33/48* (2006.01)
*G01N 21/64* (2006.01)
*G02B 5/28* (2006.01)
*G02B 5/18* (2006.01)

(52) U.S. Cl.
CPC ..... *G01N 21/6456* (2013.01); *G01N 21/6428* (2013.01); *G01N 21/6486* (2013.01); *G02B 5/1814* (2013.01); *G02B 5/1866* (2013.01); *G02B 5/285* (2013.01); *G01N 2021/6463* (2013.01); *G02B 2207/101* (2013.01)

(58) Field of Classification Search
CPC .......... G01N 21/6456; G01N 21/6486; G01N 21/6428; G01N 2021/6463; G02B 5/1866; G02B 5/285; G02B 5/1814; G02B 2207/101
See application file for complete search history.

(56) References Cited

PUBLICATIONS

Minas et al. "A MCM-based Microsystem for Biological Fluids Analysis by Optical Absorption" IEEE Xplore, 2004, p. 223-226. (Year: 2004).*

* cited by examiner

*Primary Examiner* — David P Porta
*Assistant Examiner* — Mamadou Faye
(74) *Attorney, Agent, or Firm* — Mauriel Kapouytian Woods LLP; Liang Huang

(57) ABSTRACT

A biosensor for detecting light signals emitted by a biological material is provided. The biosensor includes a light signal detector which comprises an array of light sensor pixels. The biosensor further includes a light signal filter layer disposed on a surface of the light sensor pixel array, a metal nanometer light focusing unit array layer, a grating array layer which comprises micro-gratings, and a biological material sample bearing area which comprises a plurality of sample gathering units. Each sample gathering unit aligns with one micro-grating and one metal nanometer light focusing unit in the vertical direction, and at least one of the light sensor pixels.

29 Claims, 5 Drawing Sheets

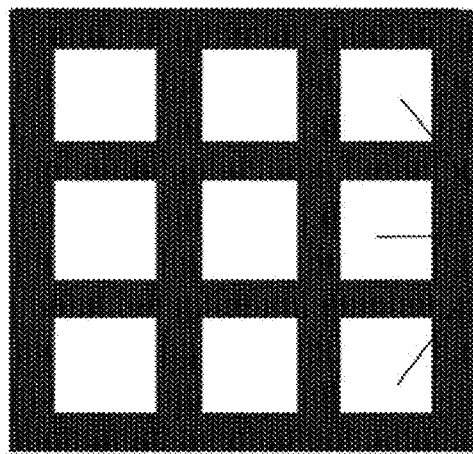
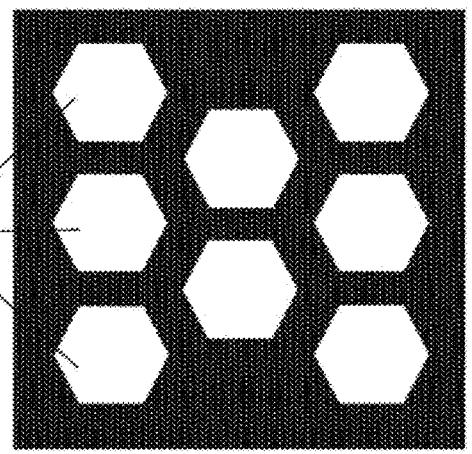
FIG. 3a  FIG. 3b
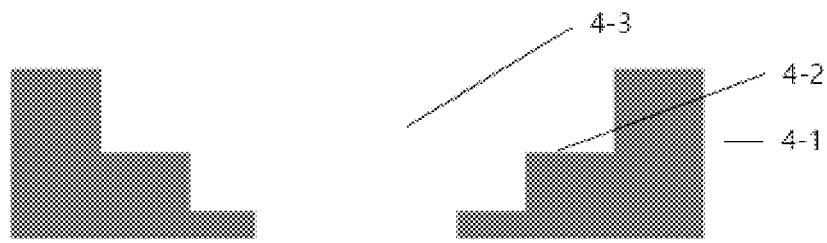
FIG. 4
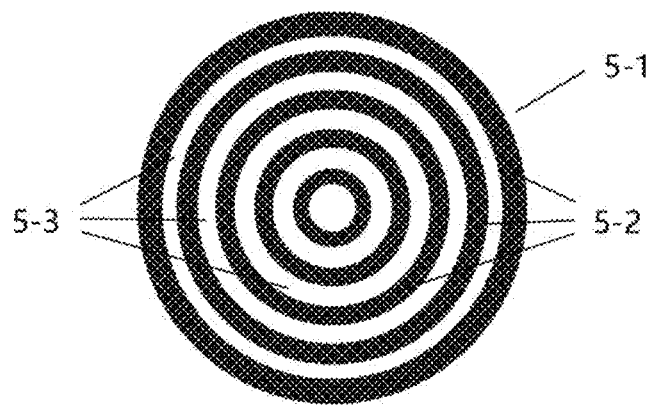
FIG. 5

BIOLOGICAL DETECTION DEVICE

CROSS REFERENCE TO RELATED APPLICATIONS

This application claims the benefit of priority to Chinese Application No. 202010837541.5, filed Aug. 19, 2020. The entire contents of this application is incorporated herein by reference for all purposes.

FIELD OF THE INVENTION

The present application relates to a biochemical detection device, in particular to a biological detection device based on a CMOS image sensor.

BACKGROUND OF THE INVENTION

In the field of in-vitro diagnostics (IVD), real-time detection using biological fluorescent signals is a very common technical means. The current mainstream detection technologies, such as immunoassay technology, molecular (nucleic acid) detection technology (such as PCR) and gene sequencing technology, all require biological fluorescent signals for real-time quantitative detection, reading and analysis. In the field of immunoassay, immunofluorescence assay technology is a rapid analysis technology commonly used for biomedical testing, with broad application prospects in the fields of microorganism, virus antigen or antibody detection, hormone detection, tumor marker detection, and drug (including heroin, morphine, ecstasy, ketamine, and the like) detection. In the immunofluorescence assay technology, an immunoreactive substance is usually required to be labeled with fluorescence, then the intensity of the fluorescence is detected to characterize the strength of specific immunoreaction, and the concentration of the substance to be detected is obtained accordingly. In the field of molecular detection, the emergence of real-time fluorescent quantitative PCR technology has greatly simplified the process of quantitative detection, and truly achieved absolute quantification of nucleic acids. The fluorescence quantitative PCR technology has been widely used in the fields of nucleic acid quantitative analysis, gene expression differential analysis, SNP detection, pathogen detection, and the like.

Since the effective sample size in in-vitro diagnostics is usually small, the intensity of fluorescent signals is often weak. Therefore, most of the fluorescence assay products currently on the market require external optical detection elements (such as CMOS, CCD or PMT devices) and customized optical path systems to amplify, read and analyze fluorescence signals, which additionally increases the sizes of detection instruments, the costs of the instruments and the time required for detection, so these products cannot meet the requirements of some medical scenarios, especially primary medical scenarios, such as the requirements for portability, rapidness, and low-cost detection.

In order to achieve the miniaturization of products, the usual methods are to streamline external optical paths, shorten liquid paths, or reduce fluid volumes. Although these methods can reduce the volumes of the instruments to a certain extent, the effect is limited.

In order to further improve the integration level, the existing detection technology uses a CMOS image sensor to directly fix a biological or chemical substance on the surface of an image sensor chip for detection, and guide the fluorescence emitted by the biological or chemical substance to a photodiode in the image sensor in a certain way, and then judge the corresponding information of the biological or chemical substance based on the intensity and color of the detected light signal.

In a fluorescence detection system based on a CMOS image sensor, the factor that has the greatest impact on the final imaging effect is the signal-to-noise ratio (SNR). There are two sources of noise: background noise introduced by excitation light, and crosstalk noise derived from the fluorescence emitted by adjacent biological samples. In order to eliminate the background noise, a general way is to use a filter structure to filter background light bands such as the excitation light. However, the filter structure in the prior art is insufficient to filter the background noise and the crosstalk noise, and it is necessary to further improve the structure to improve the signal filter effect.

In addition, most of the biological detection instruments based on optical sensors on the market still require external optical detection elements and optical path systems to read and analyze the light signals emitted by the biological material samples, which additionally increases the volumes and the costs of the instruments, and meanwhile prolongs the detection time, therefore the instruments are not suitable for application scenarios that have certain requirements for portability and immediacy.

SUMMARY OF THE INVENTION

In order to solve the above-mentioned problems in the prior art, one embodiment of the present invention provides a biosensor for detecting light signals emitted by a biological material, comprising:

a light signal detector for receiving and detecting incident light signals, comprising a light sensor pixel array which comprises a plurality of light sensor pixels;

a light signal filter layer, disposed on the surface of the light sensor pixel, comprising a plurality of laminated layers, wherein each laminated layer comprises two material layers with different refractive indices for filtering other light signal components except for the light signals emitted by the biological material in the incident light signals;

a metal nanometer light focusing unit array layer, disposed on the surface of the light signal filter layer, comprising a plurality of metal nanometer light focusing units, and configured to focus the light signals emitted into the metal nanometer light focusing units and emit the same into the light signal filter layer;

a grating array layer, disposed on the surface of the metal nanometer light focusing unit array layer, comprising a plurality of micro-gratings, and configured to constrain the incident light signals, so that the incident light signals are emitted into the metal nanometer light focusing unit array layer; and a biological material sample bearing area, disposed on the surface of the grating array layer and comprising a plurality of sample gathering units, wherein each sample gathering unit is configured to gather a sample of the biological material, and the sample of the biological material can produce light signals and emit the same into the grating array layer;

wherein each sample gathering unit aligns with one of the micro-gratings and one of the metal nanometer light focusing units in the vertical direction, and at least one of the light sensor pixels.

In one preferred embodiment of the present invention, the light signal detector comprises a CMOS image sensor, the light sensor pixel array comprises a CMOS pixel array, and each CMOS pixel in the array comprises a photodiode.

In one preferred embodiment of the present invention, the CMOS image sensor is of front side illuminated (FSI) or back side illuminated (BSI).

In one preferred embodiment of the present invention, the biosensor further comprises a fluid control device disposed on the grating array layer to contain the biological material sample bearing area, and the fluid control device is configured to introduce the biological material to be detected into the biological material sample bearing area. The fluid control device comprises a glass or plastic shell with a flow channel, and at least a pair of sample inlet and sample outlet are formed in the shell, so that the material sample reaches the surface of the sample gathering unit through the sample inlet and the flow channel and can flow out from the sample outlet.

According to the above embodiments, the light signal constraining, focusing and filtering structure of the biosensor of the present invention can filter most of the background light signals, thereby greatly reducing the background noise, and the light signals emitted by the biological sample are focused on the light sensor pixels, so that the detection result is more accurate.

Furthermore, the biological detector of the present invention adopts an CMOS image sensor (CIS) chip, and the sample fluid control device is integrated on the surface of the sensor chip, thereby providing a system on chip (SOC) biosensor. In the biosensor of the present invention, the manipulation of the sample fluid, the capture of the biological sample in the fluid, the chemical reactions of the biological sample, and the collection and treatment of the light signals emitted by the biological sample can be accomplished on the surface of the CIS chip, so the integration level of the detection system is greatly improved, while the detection time and the detection cost are greatly reduced.

BRIEF DESCRIPTION OF THE DRAWINGS

FIG. 3a and FIG. 3b are top views of metal side walls in different embodiments of the present invention.

FIG. 4 is a vertical sectional view of a metal nanometer light focusing unit in one embodiment of the present invention.

FIG. 5 is a schematic diagram of a miniature ring grating in one embodiment of the present invention.

DETAILED DESCRIPTION OF THE INVENTION

The embodiments of the present invention will be described below with reference to the drawings.

The exemplary embodiments will be described in detail herein, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the present application. On the contrary, they are merely examples of devices and methods consistent with some aspects of the present application as detailed in the appended claims.

The terms used in the present application are only for the purpose of describing specific embodiments, and are not intended to limit the present application. The singular forms of "a", "said" and "the" used in the present application and the appended claims are also intended to include plural forms, unless the context clearly indicates other meanings. It should also be understood that the term "and/or" as used herein refers to and includes any or all possible combinations of one or more associated listed items. "Including" or "comprising" and other similar words mean that the elements or items before "including" or "comprising" now cover the elements or items listed after "including" or "comprising" and their equivalents, and do not exclude other elements or items.

Figure 1:
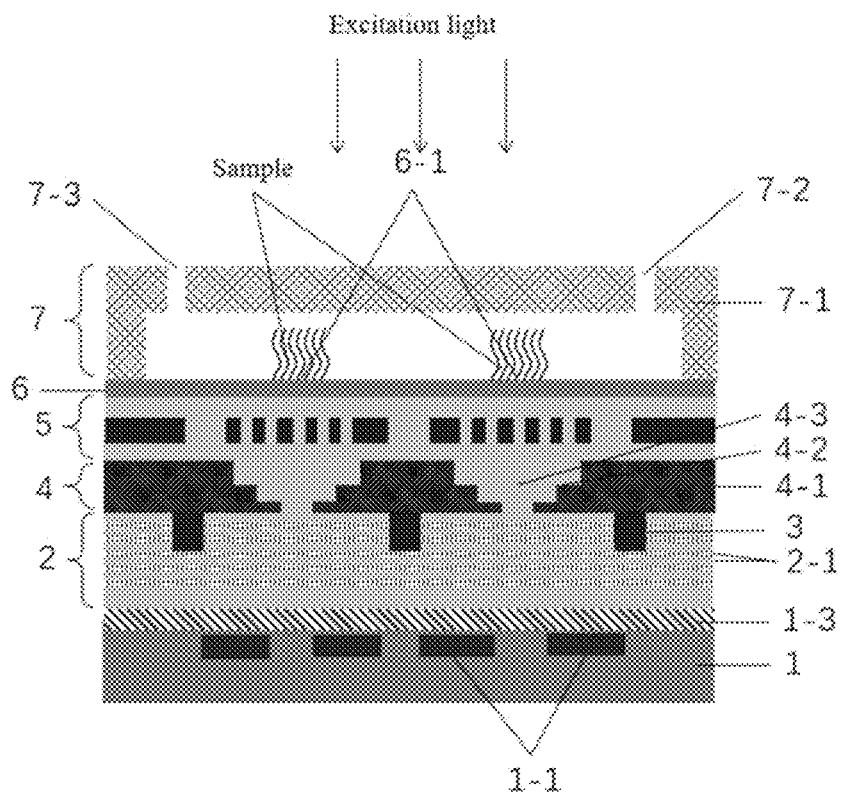
FIG. 1 is a schematic diagram of a vertical section of one embodiment of a biosensor of the present invention.

FIG. 1 shows one embodiment of a biosensor of the present invention. As can be seen in the figure, the biosensor of the present invention includes (from bottom to top): a CMOS image sensor (CIS) chip 1, a light signal filter layer 2, a metal side wall 3, a metal nanometer light focusing unit array layer 4, a grating array layer 5, a biological material sample bearing area 6 and a fluid control device 7.

As shown in FIG. 1, the light signal filter layer 2 is disposed on the above-mentioned CIS chip 1 and includes a plurality of laminated layers 2-1. Each laminated layer 2-1 comprises two material layers with different refractive indices for filtering other light signal components except for the light signals emitted by the biological material in the incident light signals. Generally speaking, it is required that the difference value between the refractive indices of the two materials is no less than 0.01. For example, the material with higher refractive index can be selected from one of titanium oxide, hafnium oxide, tantalum oxide, zirconium oxide, gallium phosphide and germanium, and the material with lower refractive index can be selected from one of SiO2, Teflon, various metal oxides (such as oxides of metals such as aluminum, zirconium and titanium). Depending on different refractive indices, for example, 70-120 laminated layers of TiO2/SiO2, 70-100 laminated layers of ZrO2/SiO2, or 30-50 laminated layers of GaP/TiO2 can be used. Generally speaking, the upper layer in each laminated layer uses a material with a higher refractive index, that is, the light signal is incident from the material layer with the higher refractive index.

As shown in FIG. 1, the metal side wall 3 is disposed at the upper part of the light signal filter layer 2, the metal side wall 3 extends downward from the upper surface of the light signal filter layer 2 to a certain depth, for example, the depth can be between 0.5 um-6 um. The metal side wall 3 divides the light signal filter layer 2 into a grid shape within its depth range. The metal side wall 3 can be made of a material selected from one of tungsten, chromium, nickel, copper, silver and gold.

A metal nanometer light focusing unit array layer 4 is disposed on the upper surface of the light signal filter layer 2, and it includes an array comprising metal nanometer light focusing units 4-1. Each light focusing unit 4-1 is provided with a step or steps 4-2 and a through hole 4-3. The number of steps 4-2 ranges from 2 to 5, the width of each step can be set as 200 nm to 400 nm, and the height can be set as 200 nm to 800 nm. The material forming the metal nanometer light focusing unit can be selected from one of aluminum, tungsten, titanium oxide, hafnium oxide, tantalum oxide, zirconium oxide and aluminum oxide, and the through hole 4-3 is filled with a transparent material, for example, silicon dioxide. As can be seen in FIG. 1, the through hole 4-3 has a larger upper opening and a smaller bottom opening. The metal nanometer light focusing units 4-1 form an array and are aligned with the grids formed by the aforementioned metal side wall 3, that is, the bottom opening of each through hole 4-3 is positioned in one grid 3-1 defined by the aforementioned metal side wall 3.

The grating array layer 5 is disposed on the metal nanometer light focusing unit array layer 4. The grating array layer 5 includes a grating array composed of a plurality of miniature ring gratings 5-1, which is for example a concentric circular rings. The difference value between the inner and outer diameters of each circular ring is equal. The adjacent two circular rings should be composed of different dielectric materials, such as materials with high refractive and low refractive indices. The difference value between the inner and outer diameters of each circular ring could range from 200 nm to 400 nm. The high refractive index material can be, for example, titanium oxide, hafnium oxide, tantalum oxide, zirconium oxide, aluminum oxide, silicon nitride, and the like. The process method can be physical vapor deposition, chemical vapor deposition, or the like. The low refractive index material can be, for example, silicon dioxide.

The ring grating should correspond to the metal nanometer light focusing unit array layer below it, that is, each micro ring grating 5-1 aligns with a metal nanometer light focusing unit 4-1. The thickness of the grating array layer 5 can be set as from 300 nm to 500 nm. Of course, other suitable gratings can also be used in the grating array layer 5.

The biological material sample bearing area 6 is disposed on the grating array layer 5.

The bearing area 6 includes a plurality of parts for attracting a biological material sample, that is, sample gathering units 6-1. The other part of the bearing area 6 besides the sample gathering units 6-1 are configured to repel the biological material. A plurality of sample gathering units 6-1 form an array, and each sample gathering unit 6-1 aligns with a miniature ring grating 5-1.

The sample gathering unit 6-1 comprises an area that attracts the biological material sample, which can be formed by depositing hydrophilic materials, for example, depositing silane or silane compound on hydrophilic materials such as Ta2O5, silicon nitride and silicon dioxide. The other parts of the bearing area 6 are treated or made to repel the biological material by depositing hydrophobic materials, such as titanium dioxide, Teflon and metals on the surface thereof.

A fluid control device 7 is disposed on the grating array layer 5-1 to surround and contain the biological material sample bearing area 6 so as to introduce the biological material sample to be detected onto the surface of the biological material sample bearing area 6, so that the material sample is gathered on the sample gathering units 6-1. The fluid control device 7 includes a glass shell 7-1 with at least a flow channel, and at least a pair of sample inlet 7-2 and sample outlet 7-3 are formed in the shell. The flow channel is not shown in the figure, and it should be designed and configured to enable the material sample to flow to the surfaces of the sample gathering units 6-1. The biological material sample to be detected flows into the glass shell 7-1 through the sample inlet 7-2, reaches the biological material sample bearing area 6 through the flow channel therein, and is attached to the surfaces of a plurality of sample gathering units 6-1, and the excessive biological material sample flows out through the sample outlet 7-3. The shell 7-1 can also be made of transparent plastic.

As shown in FIG. 1, the biological material sample on the surface of the sample gathering unit 6-1 is irradiated by an excitation light, and is excited to generate fluorescence. The fluorescence generated by the sample are initially in a divergent form, and become roughly parallel light signals after passing through the micro-gratings 5-1. Then, the light signals are input into the upper opening of the through hole 4-3 of the metal nanometer light focusing unit 4-1, focused and output onto the light signal filter layer 2 from the lower opening. The metal side wall 3 are used to block light signals from neighboring samples, thereby preventing crosstalk of the fluorescence emitted by adjacent samples. The light signal filter layer 2 is used for filtering irrelevant light signals other than the excited fluorescence, for example, the excitation light, so that only the fluorescence signals reach the receiving surfaces of one or more photodiodes 1-1 in the corresponding CMOS image sensor, and as a result, an accurate detection result is obtained. It should be pointed out that the number of the photodiodes corresponding to one sample gathering unit 6-1 is preferably within the range of 1 to 16.

In one preferred embodiment of the present invention, 107 laminated layers of TiO2/SiO2 are adopted. The light signal filter layer formed thereby has a high transmission rate of at least 80% for the fluorescence of the sample, and a filtration rate as high as 99.9999% or more for the excitation light. At the same time, the light signal filter layer has high angular selectivity for the incident light. When the incident light angle is 0°, the transmission rate is about 90%, and when the incident light angle is increased to about 30°, the transmission rate is drastically reduced to be less than 1%. Therefore, the effective fluorescent signal angle that each photodiode can receive is limited, and the fluorescent signals emitted by the adjacent samples are almost completely filtered, thereby avoiding the crosstalk of the fluorescent signals of the adjacent samples.

Figure 2A:
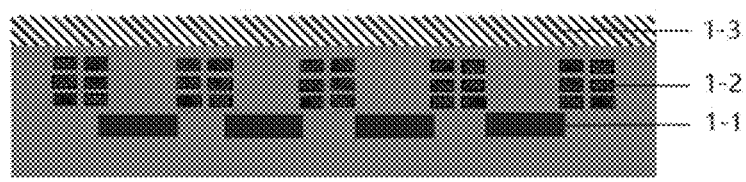
FIG. 2a is a schematic diagram of a front side illuminated CMOS image sensor in one embodiment of the present invention.
Figure 2B:
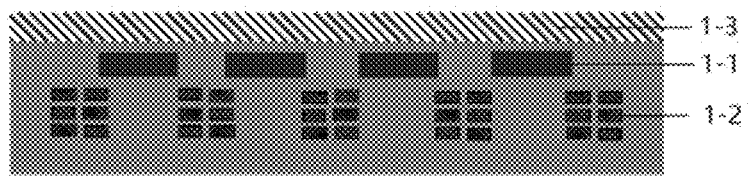
FIG. 2b is a schematic diagram of a back side illuminated CMOS image sensor in one embodiment of the present invention.

As shown in FIGS. 2a and 2b, the CIS chip 1 may adopt a front side illuminated (FSI) CMOS image sensor or a back side illuminated (BSI) CMOS image sensor, or other suitable image sensor. FIG. 2a schematically shows an FSI CMOS image sensor, which includes a photodiode 1-1 for receiving and detecting light signals, a metal wiring 1-2 and a passivation layer 1-3 disposed on the surface of the chip. FIG. 2b schematically shows a BSI CMOS image sensor, which also includes a photodiode 1-1 for receiving and detecting light signals, a metal wiring 1-2 and a passivation layer 1-3 disposed on the surface of the chip. It is different from the FSI CMOS image sensor in FIG. 2a mainly in that the metal wiring is disposed below the photodiode. Obviously, the present invention is not limited to be applied to the BSI or FSI CMOS image sensors, and is also applicable for other image sensors.

FIG. 3a schematically shows a plurality of square grids on the upper surface of the light signal filter layer 2, wherein each grid 3-1 is in a shape of square. FIG. 3b schematically shows a plurality of hexagonal grids on the upper surface of the light signal filter layer 2, wherein each grid 3-1 is a shape of hexagon. Of course, other suitable grid shapes can also be used, such as a shape of circle.

FIG. 4 schematically shows the vertical sectional view of the metal nanometer light focusing unit 4-1 in one embodiment of the present invention. Although not shown in the figure, it can be understood that the shape of a horizontal sectional view of the metal nanometer light focusing unit 4-1 can be the same as the shape of the grid shown in FIG. 3a or FIG. 3b, which is in a shape of square or hexagonal. Of course, it can also be made with other shapes, such as a circle.

FIG. 5 schematically shows a top view of a miniature ring grating 5-1. Although the grating is shown as having a plurality of circular rings, the ring grating 5-1 of the present invention may only include one ring. For example, the dark-colored circular ring 5-2 is made of a low refractive index material, and the light-colored circular ring 5-3 is made of a high refractive index material.

Figure 6:
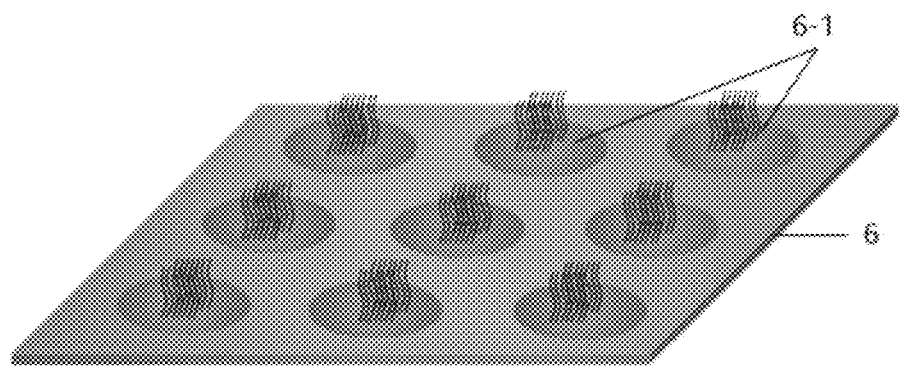
FIG. 6 is a three-dimensional schematic diagram of a biological material sample bearing area in one embodiment of the present invention.

FIG. 6 is a three-dimensional schematic diagram of the biological material bearing area 6 in one embodiment of the present invention. As can be seen in the figure, a plurality of sample gathering units 6-1 form an array. As mentioned above, each sample gathering unit 6-1 aligns with one miniature ring grating 5-1.

FIG. 7 to FIG. 10 schematically show the manufacturing steps of the biosensor in one embodiment of the present invention.

Figure 7:
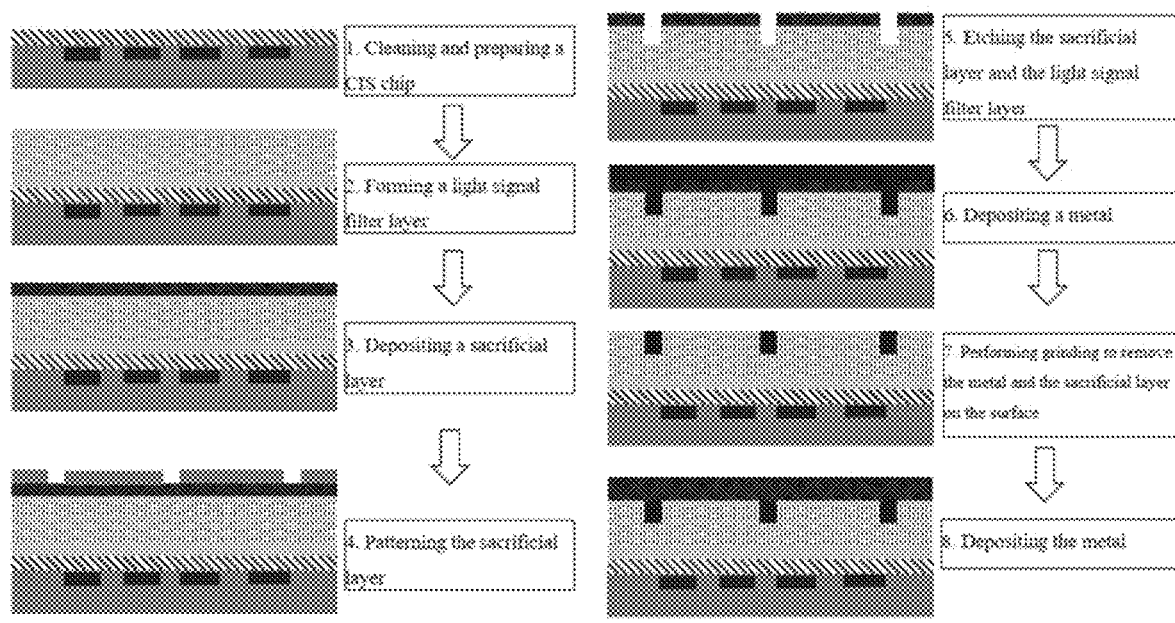
FIG. 7 to FIG. 10 are schematic flow diagrams of a manufacturing method of the biosensor according to one embodiment of the present invention.

FIG. 7 shows the manufacturing method of the light signal filter layer and the metal side wall in one embodiment of the biosensor of the present invention.

Step 1: clean and prepare a CIS chip.

Step 2: deposit a plurality of laminated layers on the passivation layer on the surface of the chip, wherein each laminated layer includes two dielectric material layers with different refractive indices. The material with higher refractive index can be selected from titanium oxide, hafnium oxide, tantalum oxide, zirconium oxide, gallium phosphide, germanium, and the like, and the material with lower refractive index can be selected from SiO2, Teflon, metal oxide, and the like. For example, TiO2/SiO2 laminated layers, ZrO2/SiO2 laminated layers, or GaP/TiO2 laminated layers are preferred. The manufacturing method can use chemical vapor deposition (enhanced ion-assisted chemical vapor deposition, high-density ion-assisted vapor deposition, and the like), physical vapor deposition (such as ion source assisted electron gun evaporation coating, magnetron injection coating and ion coating), or atomic layer deposition and so on. The light signal filter layer 2 thereby obtained will allow the fluorescent signals generated by the sample to pass through, while filtering the excitation light (background light).

Step 3: deposit a sacrificial layer on the light signal filter layer 2, such as a silicon carbide or silicon nitride layer.

Step 4: apply photoresist on the sacrificial layer and form a required pattern. Specifically, the photoresist is coated by spin coating and is baked and hardened. The rotation speed is preferred to be controlled at 500 to 5000 r/min, while the baking temperature is controlled at 100° C. to 120° C. The deep ultraviolet light is used for exposure. The exposure light power can be selected from 0.1 to 10 W, and the exposure time can be set at 0.1 to 20 seconds. The required pattern is achieved and displayed by using a developing solution. The shape of the pattern can be square, circle or hexagon, or the like, among theses a square shape is preferred. A tetramethylammonium hydroxide solution with a mass ratio of 2.38% can be used as the developing solution.

Step 5: etch the shape of the grid of the metal side wall, wherein the etching method includes dry etching, and the like. Then remove the photoresist via oxygen burning at high temperature, wherein the burning process temperature can be selected from 110° C. to 280°, and the burning time is set at a few seconds to a few minutes. Clean the chip by using SC1 and SC2 as cleaning agent, if necessary, using a strong oxidizing sulfuric acid solution or a mixed solution of sulfuric acid and hydrogen peroxide.

Step 6: deposit a layer of metal to form the metal side wall. The metal material can be tungsten, chromium, nickel, copper, silver, gold, titanium or titanium nitride, and the like. The fabrication method can be physical vapor deposition or chemical vapor deposition, electroplating, and the like. The metal layer can be opaque to emitted light, and/or be opaque to the excitation light.

Step 7: perform grinding to remove the metal layer and the sacrificial layer on the surface, thereby leaving the metal side wall buried in the light signal filter layer, and forming a metal grid on the surface of the light signal filter layer. FIG. 3a or FIG. 3b shows two grid shapes, that is, square and hexagon. Other patterns can also be formed if needed. The metal grids constitute the metal side wall. The depth of the metal side wall, can be set as from 0.5 um to 6 um.

Step 8: deposit metal again on the surface of the light signal filter layer to prepare for the next step of manufacturing the metal nanometer light focusing unit. The metal material can be aluminum, tungsten, and the like, and can also be replaced with high refractive index materials such as titanium oxide, hafnium oxide, tantalum oxide, zirconium oxide and aluminum oxide. Aluminum is preferred. The processing method can be physical vapor deposition, chemical vapor deposition, atomic layer deposition and so on.

Figure 8:
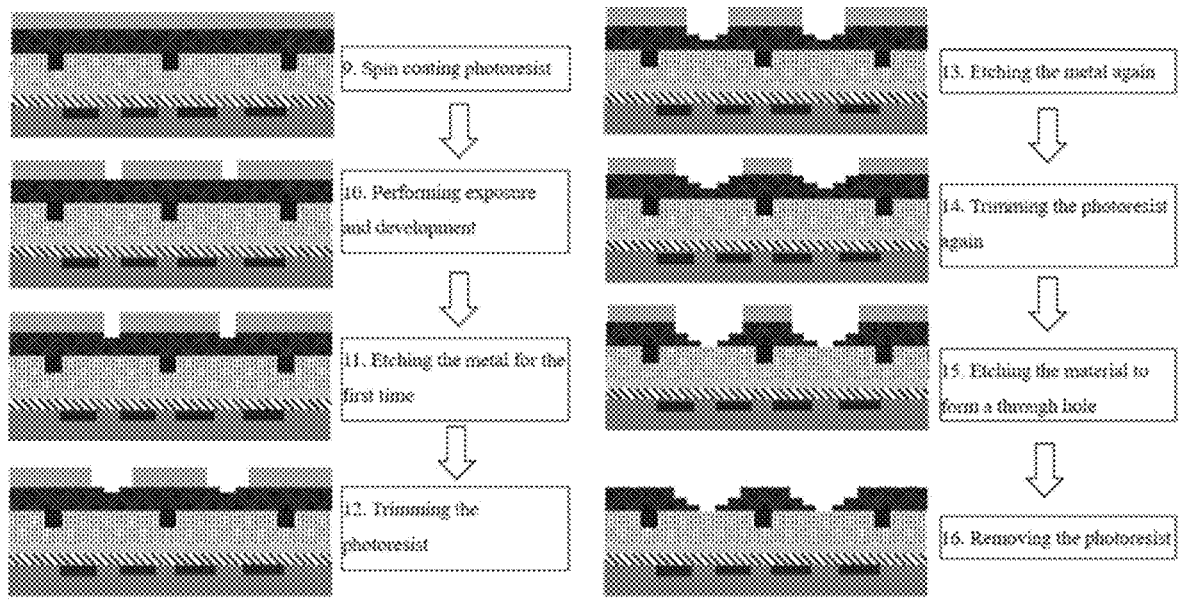

FIG. 8 continues the processing steps in FIG. 7 and shows the formation steps of the metal nanometer light focusing unit array layer according to one embodiment of the present invention.

Step 9: spin coat photoresist.

Step 10: perform photolithography technology to form the pattern of the metal nanometer light focusing unit array.

Step 11: etch the exposed metal material to a certain depth to form the bottom opening of the metal nanometer light focusing unit.

Step 12: trim the photoresist by using the photoresist trim process to expose more metal material.

Step 13: conformally etch the metal material to a certain depth to form the first step. Since it is self-aligned, the width of the first step is only related to the shape of the bottom opening formed in step 11.

Step 14: trim the photoresist again with oxygen to enlarge the pattern.

Step 15: perform conformal etching of the metal material to form a through hole as the bottom opening and form a second step.

Step 16: remove the photoresist to expose the third step.

If necessary, steps 12 to 15 can be repeated to form more steps. Or, step 14 could be omitted to reduce the number of the steps. It should be noted that the trim process of the photoresist will not only etch the side wall of the photoresist, but also deplete the top side of the photoresist, so the firstly coated photoresist should be thick enough. The purpose of the metal nanometer light focusing unit array is to focus the fluorescence generated by the sample and introduce the same into the light transmitting area of the metal grid, so the focal point should be aligned with the light-transmitting area of one metal grid, that is, the bottom opening of the metal nanometer light focusing unit should be positioned in one grid.

Figure 9:
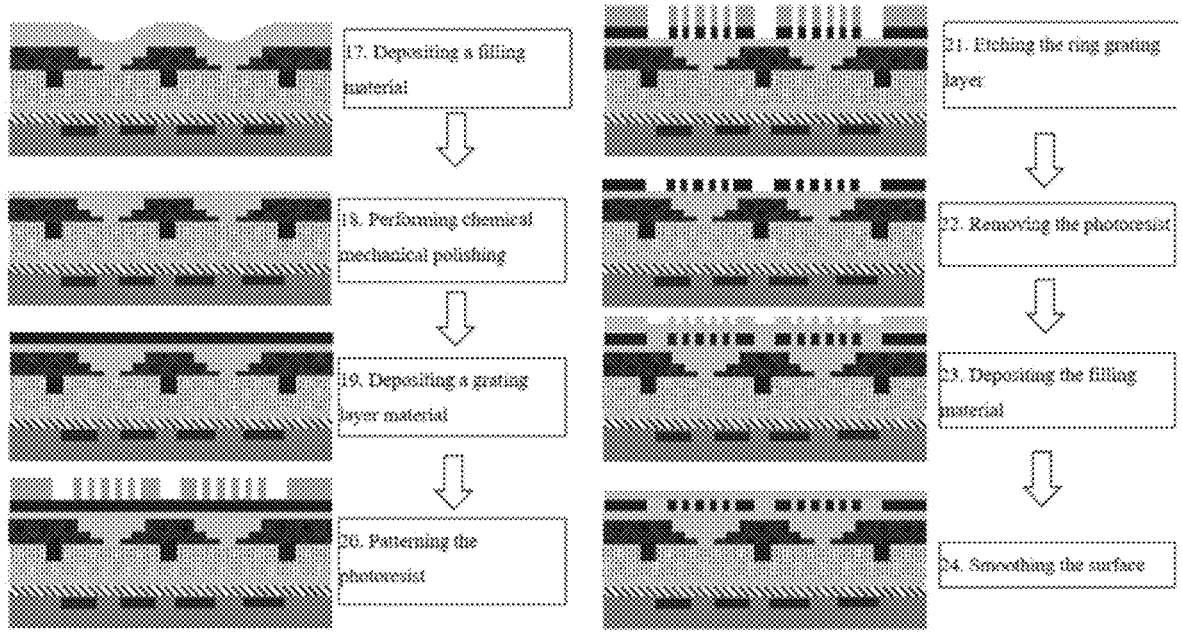

FIG. 9 further shows the forming method of the grating array layer.

Step 17: on the basis of step 16, further deposit a filling material, for example, silicon dioxide, to fill the through holes of the metal nanometer light focusing unit array.

Step 18: perform chemical mechanical polishing to make the surface flat.

Step 19: deposit a layer of grating layer material with a thickness of 200 nm to 400 nm, as an example. A high refractive index material, such as titanium oxide, hafnium oxide, tantalum oxide, zirconium oxide, aluminum oxide and silicon nitride could be used. The processing method can be physical vapor deposition, chemical vapor deposition, and so on.

Step 20: form the photoresist pattern. The photoresist is coated by spin coating and is baked and hardened. The rotation speed is controlled at 500 to 5000 r/min. The baking temperature is controlled at 100° C. to 120° C. Use deep ultraviolet light for lithography. The required pattern is formed by using a developing solution.

Step 21: etch out a desired ring grating pattern. The etching method includes wet etching, dry etching and so on.

Step 22: remove the photoresist by burning with oxygen at a high temperature for a few seconds to several minutes, and finally, clean the chip. A ring grating structure is formed thereby.

Step 23: deposit a conventional low refractive index material, for example, silicon dioxide.

Step 24: use chemical mechanical polishing to planarize the surface. The thickness of the remaining material on the upper part of the grating is preferred to be about 100 nm.

Figure 10:
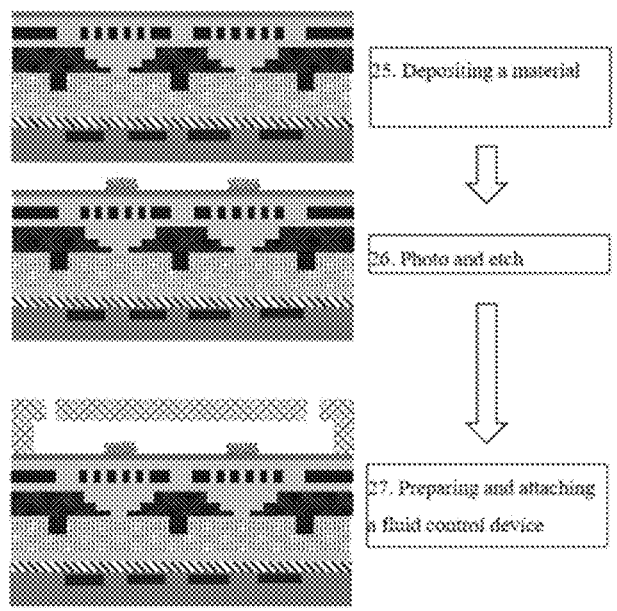

FIG. 10 shows the steps of forming the biological material bearing area and the fluid control device in one embodiment of the present invention.

Step 25: first deposit a thin layer of hydrophilic biochemical functional material (such as Ta2O5, silicon nitride and silicon dioxide), and a thick layer of hydrophobic non-biochemical functional material (such as hafnium oxide, oxide tantalum, zirconia, alumina and silicon nitride).

Step 26: then, use photolithography technology to form desired pattern on the non-biochemical functional material, and etch the material. The etching should be stopped on the thin biochemical functional material. Remove the photoresist from the chip and clean the chip. Then use photolithography technology to deposit a biochemical functional membrane material, for example, silane or silane compounds (including but not limited to aminopropyltrimethoxysilane, or the like), on the thin biochemical functional material. In this way, the biological material bearing area is formed, wherein the parts covered with the biochemical functional membrane material can attract the biological material sample, and become the sample gathering units 6-1, and the other parts are covered with the hydrophobic non-biochemical functional material and repel the biological material sample.

An alternative method of forming the biological material bearing area is to directly coat the photoresist on the upper surface of the grating array layer formed in step 24, form pattern on the photoresist, and etch away a part of grating layer material, thereby form a pit array. Deposit biochemical functional material to the bottom of the pits, such as silane or silane compounds (including but not limited to aminopropyltrimethoxysilane, or the like). The surface of the grating layer formed by this method can be directly used as the biological material bearing area, and the pits covered with the biochemical functional material attached become the sample gathering units 6-1.

Step 27: install the fluid control device on the biological material bearing area on the surface of the chip. This step can be implemented during the chip packaging process. Perforate on the packaging glass for fabricating the shell 7-1 of the fluid control device as desired. There must be at least a pair of sample inlet 7-2 and sample outlet 7-3 for each chip. Then attach solid photoresist with a certain thickness to the a packaging glass, wherein the thickness of the photoresist will be the height of a hollow flow channel in the fluid control device, and then perform photolithography technology to form the desired flow channel structure. The packaging glass and the chip are precisely aligned, stacked and pressed together. The height of the flow channel ranges from 10 um to 200 um, and the height of the packaging glass ranges from 0.1 mm-1 mm. The shell of the fluid control device can also be made of highly transparent plastic polymers (including but not limited to plastic materials such as PMMA/PS/PC).

It should be noted that in the embodiments of the present invention, the terms "including", "containing" or any other variations thereof are intended to cover non-exclusive inclusion, so that a process, a method, an article or a device including a series of elements not only includes those elements, but also includes other elements that are not explicitly listed, or elements inherent to the process, the method, the article, or the device. If there are no more restrictions, the element defined by the sentence "includes one" does not exclude the existence of the other same elements in the process, the method, the article, or the device that includes the element.

Although the present invention has been illustrated and described with reference to certain preferred embodiments, those of ordinary skill in the art should understand that various changes can be made in form and details without departing from the spirit and scope of the present invention.

The invention claimed is:

1. A biosensor for detecting light signals emitted by a biological material sample, comprising:
   a light signal detector for receiving and detecting incident light signals, the light signal detector comprising a light sensor pixel array which comprises a plurality of light sensor pixels;
   a light signal filter layer disposed on a surface of the light sensor pixel array, the light signal filter layer comprising a plurality of laminated layers, wherein each of the plurality of laminated layers comprises two material layers with different refractive indices for filtering light components other than the light signals emitted by the biological material sample in the incident light signals;
   a metal nanometer light focusing unit array layer disposed on a surface of the light signal filter layer, the metal nanometer light focusing unit array layer comprising a plurality of metal nanometer light focusing units, and being configured to focus light signals emitted into the metal nanometer light focusing units and emit the same into the light signal filter layer;
   a grating array layer disposed on a surface of the metal nanometer light focusing unit array layer, the grating array layer comprising a plurality of micro-gratings, and being configured to constrain the incident light signals, so that the incident light signals are emitted into the metal nanometer light focusing unit array layer; and
   a biological material sample bearing area disposed on a surface of the grating array layer, the biological material sample bearing area comprising a plurality of sample gathering units, wherein each of the plurality of sample gathering units is configured to gather a sample of the biological material sample, and at least one of the the biological material sample being capable of producing light signals and emitting the same into the grating array layer;

wherein each of the plurality of sample gathering units aligns with one of the plurality of micro-gratings and one of the plurality of metal nanometer light focusing units in a vertical direction, and at least one of the light sensor pixels.

2. The biosensor of claim 1, wherein the light signal detector comprises a complementary metal oxide semiconductor (CMOS) image sensor, and wherein the light sensor pixel array comprises a CMOS pixel array, and each CMOS pixel in the CMOS pixel array comprises a photodiode.

3. The biosensor of claim 2, wherein the CMOS image sensor is of front side illuminated (FSI) or back side illuminated (BSI).

4. The biosensor of claim 2, wherein each of the plurality of metal nanometer light focusing units in the metal nanometer light focusing unit array layer aligns with one CMOS pixel in the CMOS pixel array in the vertical direction, and the light signal focused by each of the plurality of metal nanometer light focusing units is received and detected by the photodiode in the aligned CMOS pixel.

5. The biosensor of claim 2, wherein each of the plurality of metal nanometer light focusing units in the metal nanometer light focusing unit array layer aligns with a plurality of CMOS pixels in the CMOS pixel array in the vertical direction, and the light signal focused by each of the plurality of metal nanometer light focusing units is received and detected by the photodiodes in the plurality of the aligned CMOS pixels.

6. The biosensor of claim 5, wherein a number of the plurality of CMOS pixels aligned with one metal nanometer light focusing unit is from 2 to 16.

7. The biosensor of claim 2, wherein a passivation layer is disposed on a surface of the CMOS image sensor.

8. The biosensor of claim 7, wherein the passivation layer comprises a silicon dioxide layer.

9. The biosensor of claim 1, wherein each of the plurality of laminated layers of the light signal filter layer comprises two dielectric material layers with different refractive indices, and a difference value between the refractive indices of the two dielectric material layers is equal to or greater than 0.01.

10. The biosensor of claim 9, wherein at least one of the plurality of the laminated layers is a TiO2/SiO2 laminated layer, and a total number of the plurality of laminated layers is from 70 to 120.

11. The biosensor of claim 9, wherein at least one of the plurality of the laminated layers is a ZrO2/SiO2 laminated layer, and a total number of the plurality of laminated layers is from 70 to 100.

12. The biosensor of claim 9, wherein at least one of the plurality of the laminated layers is a GaP/TiO2 laminated layer, and a total number of the plurality of laminated layers is from 30 to 50.

13. The biosensor of claim 1, wherein each of the plurality of metal nanometer light focusing units comprises a through hole with multiple steps, wherein a transparent material is filled in the through hole, and wherein the through hole has an upper opening and a bottom opening, the upper opening being larger than the bottom opening.

14. The biosensor of claim 13, wherein a cross sectional shape of the through hole is circular, square, or hexagonal.

15. The biosensor of claim 13, wherein a number of the multiple steps is from 2 to 5.

16. The biosensor of claim 13, wherein the transparent material filled in the through hole of the metal nanometer light focusing unit comprises silicon dioxide, and wherein the material forming the metal nanometer light focusing unit comprises one of: aluminum, tungsten, titanium oxide, hafnium oxide, tantalum oxide, zirconium oxide, and aluminum oxide.

17. The biosensor of claim 13, wherein a width of a step of the multiple steps of the metal nanometer light focusing unit is from 200 nm to 400 nm.

18. The biosensor of claim 13, wherein a height of each step of the multiple steps is from 200 nm to 800 nm.

19. The biosensor of claim 13, further comprising a metal side wall disposed in the light signal filter layer, wherein the metal side wall extends downward from an upper surface of the light signal filter layer to a first depth, and divides the light signal filter layer into a plurality of grids within the first depth, wherein each of the plurality of metal nanometer light focusing units aligns with one grid of the plurality of grids, and the bottom opening of the through hole of each of the plurality of metal nanometer light focusing units is positioned in a corresponding grid.

20. The biosensor of claim 19, wherein the metal side wall comprises a material selected from one of tungsten, chromium, nickel, copper, silver, gold, titanium, or titanium nitride.

21. The biosensor of claim 19, wherein a grid of the plurality of grids formed by the metal side wall is a square grid or a hexagonal grid.

22. The biosensor of claim 19, wherein the first depth of the metal side wall is from 0.5 um to 6 um.

23. The biosensor of claim 1, wherein a micro-grating of the plurality of micro-gratings comprises a ring grating.

24. The biosensor of claim 1, wherein the grating array layer has a thickness of 300 nm to 500 nm.

25. The biosensor of claim 1, wherein the plurality of sample gathering units are configured to attract the biological material sample, and an area excluding the plurality of sample gathering units in the biological material sample bearing area is configured to repel the biological material sample.

26. The biosensor of claim 25, wherein at least one of the plurality of sample gathering units that attracts at least one of the biological material sample comprises a membrane layer of a hydrophilic material.

27. The biosensor of claim 26, wherein the hydrophilic material comprises one of silane or silane compounds.

28. The biosensor of claim 25, further comprising a fluid control device disposed on the grating array layer to contain the biological material sample bearing area so as to introduce the biological material sample into the biological material sample bearing area.

29. The biosensor of claim 28, wherein the fluid control device comprises a shell with a flow channel, and at least a pair of sample inlet and sample outlet is formed in the shell, so that the biological material sample reach a surface of the plurality of sample gathering units through the sample inlet and the flow channel, and flows out from the sample outlet.

* * * * *